United States Patent [19]
Braytenbah

[11] 3,741,246
[45] June 26, 1973

[54] STEAM TURBINE SYSTEM WITH DIGITAL COMPUTER POSITION CONTROL HAVING IMPROVED AUTOMATIC-MANUEL INTERACTION

[75] Inventor: Andrew S. Braytenbah, Pennsauken, N.J.

[73] Assignee: Westinghouse Electric Corporation, Pittsburgh, Pa.

[22] Filed: Oct. 14, 1970

[21] Appl. No.: 80,710

[52] U.S. Cl. ............... 137/624.11, 60/105, 415/17, 340/172.5
[51] Int. Cl. ............................... G05b 15/00
[58] Field of Search ................. 60/105; 415/1, 17; 137/624.11; 340/172.5

[56] References Cited
UNITED STATES PATENTS
3,552,872  1/1971  Giras et al. ..................... 415/17

Primary Examiner—Alan Cohan
Attorney—F. H. Henson and R. G. Brodahl

[57] ABSTRACT

An improvement in the operation of an electric power plant utilizing a steam turbine controlled, in an automatic mode, by means of a digital computer, is accomplished by simplifying the interaction between the programmed automatic process control and the manual backup control. The position setpoint for each of a plurality of valves in the system to be controlled is established as a direct digital holding function in a respective bistable relay register. In addition, a single valve control holding register is provided which is coupled to all of the valve position controls in parallel. Automatic operation is then possible in either single valve or programmed sequential valve modes, and the programmed interaction to accomplish switching from manual to automatic control is simplified by updating the automatic control status until the single valve holding register has a setting equal to the manual control representation before consummating the manual to automatic switching. The direct digital holding registers also improve total system operation in eliminating drift with respect to the valve positions represented so as to extend the period of reliable operation in the manual mode, and also make it possible to retain the last valid position setpoints held in the respective registers prior to a computer power failure.

12 Claims, 6 Drawing Figures

FIG.1.

INVENTOR
Andrew S. Braytenbah
*Leslie S. Hecht*
ATTORNEY

STEAM TURBINE SYSTEM WITH DIGITAL COMPUTER POSITION CONTROL HAVING IMPROVED AUTOMATIC-MANUEL INTERACTION

CROSS REFERENCE TO RELATED APPLICATION

1. System and Method For Operating a Steam Turbine and An Electric Power Generating Plant by T. C. Giras and M. E. Birnbaum, Ser. No. 722,779, filed Apr. 19, 1968 now abandoned, and assigned to the same assignee as the present invention.

2. Improved Computer Positioning Control System With Manual Backup Control by T. C. Giras and W. W. Barnes, Ser. No. 815,882 filed Apr. 14, 1969, now U.S. Pat. No. 3552872 assigned to the present assignee.

BACKGROUND OF THE INVENTION

The present invention relates to computer process control systems and more particularly to electric power plant steam turbines and digital computer control systems arranged to operate such turbines.

The flow of steam through a steam turbine is determined by positioning the turbine admission valves in order to control the turbine speed and/or load. Turbine valve positioning may additionally be directed to throttle pressure control where such control is required for the steam generating system.

In the aforementioned Birnbaum and Giras copending patent application, there is presented a survey of the prior steam turbine control art. Generally, automatic steam turbine valve control has developed from essentially mechanical and mechanical-hydraulic type control systems to essentially electrohydraulic type control systems. The Birnbaum and Giras application (reference 1 above) discloses a further advanced automatic digital electrohydraulic turbine control system which employs a programmed digital computer in its preferred form. A paper entitled Digital Control For Large Steam Turbine-Generators presented to the American Power Conference during April 23-25, 1968 by M. Birnbaum and T. Giras describes a similar computer type turbine control system.

In addition to automatic control, safety and reliability in steam turbine operation usually makes it desirable to employ manual backup control. To interface the manual control with the automatic control and the steam turbine, it is necessary to provide suitable conditions for bumpless or other appropriate transfer from automatic to manual control and from manual to automatic control. In turn, the character of the automatic valve positioning control as well as the character of the interfacing arrangement itself enter into determining the efficiency and economy with which automatic/manual steam turbine control is provided. This is particularly so in relation to large steam and other turbine control systems which involve positioning control over a plurality of steam turbine admission valves.

Prior art electrohydraulic control systems typically might provide for manual backup control but such schemes are limited to analog type systems. The Giras and Barnes application (reference 2 above) is directed to a digital positioning control system and particularly a steam turbine valve positioning control system in which a digital computer provides a relatively fast and accurate positioning operation and with which a manual backup positioning control is interfaced.

The Giras and Barnes application (reference 2 above) describes a digital computer system wherein time series turbine valve position setpoint control words are converted to analog values and multiplexed for application to track and hold circuits associated with respective electrohydraulic turbine valve position control loops. During manual operation, a manual control applies a setpoint control signal to all of the track and hold circuits in parallel. A read multiplexer keeps the computer updated on valve positions during manual control.

While the Giras and Barnes system provides the first interface between the automatic operation of the digital computer and a manual backup positioning control it has certain limitations.

During automatic operation the computer must generate a relatively large number of setpoint control words and further the system must provide for the conversion of these control words into analog values before they become effective to establish the desired setpoint control. During manual operation the read multiplexing operation requires a comparable number of inputs in order to keep the computer updated with respect to the manual control. Accordingly, while the Giras and Barnes system is relatively fast with respect to the prior art and provides an important improvement with respect to the interfacing of automatic and manual controls it is limited with respect to the speed of input and output because of the number of control words which must be transmitted or received in order to operate.

A further limitation in the operation of the system of the copending application is in the period during which manual control may be effective. Since the system of the copending application relies upon track and hold circuits, periods in excess of a week of operation cannot be reliably maintained due to the relative drift which will occur among the various setpoint signals.

SUMMARY OF THE INVENTION

In accordance with the broad principles of the present invention, a digital computer positioning control system has improved performance through the introduction of a simplified interaction between the programmed automatic process control and the manual backup control. The position setpoint for each of the plurality of valves in the system to be controlled is established as a direct digital holding function in a respective bistable relay register. In addition, a single valve control holding register is provided which is coupled to all of the valve position controls in parallel. The hybrid or combined analog-digital control part of the system then provides for the digital to analog conversion of the setpoint value in a control register with the converted value of the setpoint in the single valve holding register during automatic operation or that value provided by the manual control during manual operation.

Automatic operation becomes possible then in either a single valve or programmed sequential valve mode, and the programmed interaction required to accomplish switching from manual to automatic control is simplified with respect to the technique of the copending application by updating the automatic control status until the single valve holding register has a setting equal to the manual control representation before consummating the manual to automatic switch.

The direct digital holding registers also improve total system operation in eliminating drift with respect to valve positions which are represented so as to extend the period of reliable operation in the manual mode, permitting a virtually unlimited period of manual operation. The use of bistable relays is also important as a specific improvement of the invention since these make it possible to retain the last valid position setpoint held in a respective register prior to a computer power failure. The manual backup control operation is presumed, in order to gain full advantage of this feature to have an independent power supply. In the preferred embodiment of the invention, an improvement in the specific operation of the manual control itself is accomplished through the use of a digital up/down counter which is responsive to RAISE and LOWER input signals and provides control signals which are summed with any of the then remaining setpoint signals developed during the terminated automatic operation.

DESCRIPTION OF THE PREFERRED EMBODIMENT

Figure 1:
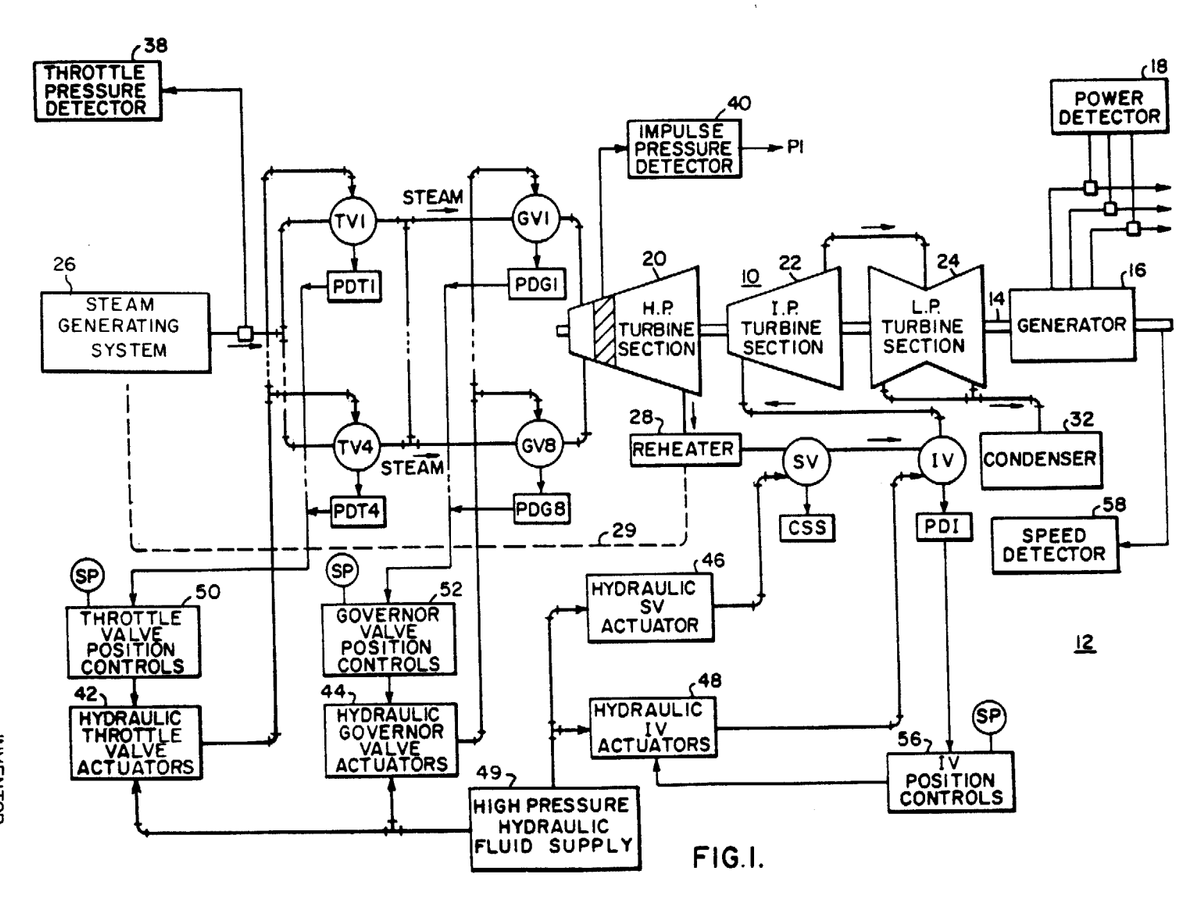
FIG. 1 shows a schematic diagram of a large steam turbine system, the valves of which are controlled according to the present invention.
Figure 2:
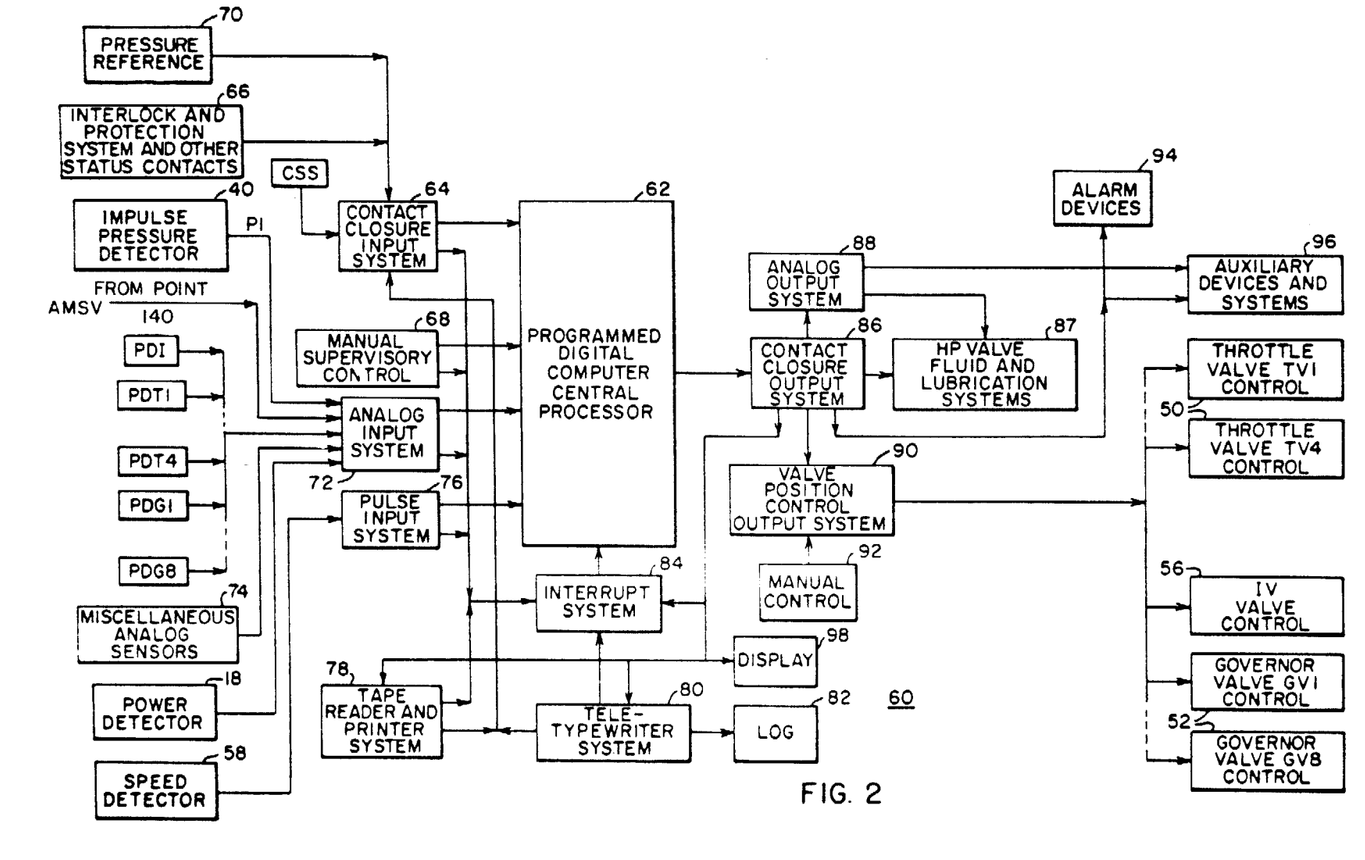
FIG. 2 shows a schematic diagram of a digital computer control system operable with the steam turbine system of FIG. 1, such computer control system being utilized to provide the digital setpoint signals employed in the control system of the present invention.

FIGS. 1 and 2 are similar to those described in the aforementioned copending patent applications constituting references (1) and (2) above and therefore will be just briefly reviewed herein.

Reference is made to FIG. 1 where steam from a suitable generating system 26 is shown as passing through throttle valves TV1-TV4 to governor valves GV1-GV8 providing steam input to a high pressure turbine section 20 forming part of a turbine-generator system 10. The positions of the valves are controlled by respective control systems, the throttle valves being controlled through position controls 50 and actuators 42 and the governor valves being controlled through controls 52 and actuators 44. Various setpoint signals are shown as being applied to the controls, representing digital output words, as will be discussed in further detail with respect to FIGS. 3 and 5 herein.

Although consideration herein will be directed primarily to the control of governor valves GV1 through GV8 it will be understood that the principles herein developed are applicable as well to throttle valve control or to the control of other valves such as intercept and stop valves shown following reheater 28 in FIG. 1.

In FIG. 2 the relationship between central processor 62 and various means utilized according to the present invention is shown in block diagram form. It will be noted that the processor 62 provides certain output signals applied to contact closure output system 86 which direct computer words to the valve position control output system 90. Control output system 90 also receives an input from manual control 92, a specific form of which is provided by the present invention. It will be noted that processor 62 receives certain input signals through an analog input system 72 including signal AMSV (auto-manual single valve) from a point 140 shown in FIG. 3. Signal AMSV will be discussed in connection with FIG. 3 as being a feedback signal referencing the position of the manual or single valve automatic control to facilitate the "bumpless" transfer between automatic and manual modes of operation.

Figure 3:
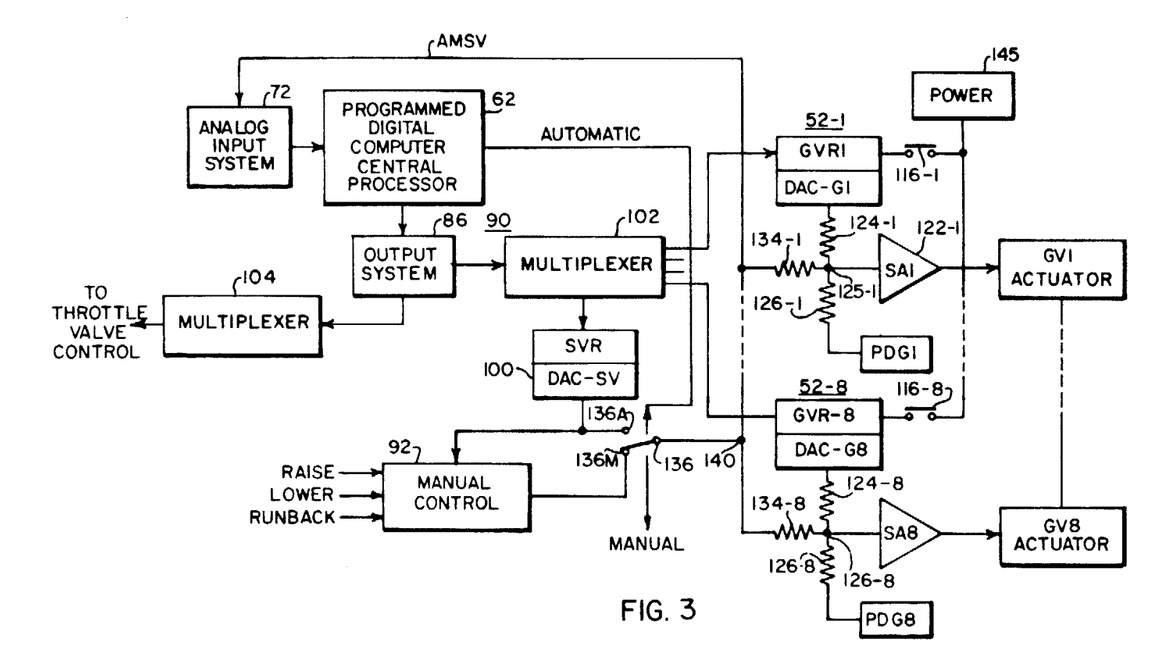
FIG. 3 is a schematic diagram showing how the system of the present invention is interconnected with the computer control system of FIG. 2 to provide the improved functioning of the invention.

Reference is now made to FIG. 3 where it will be noted that setpoint control words provided by processor 62 are passed through output system 86 to digital multiplexers 102 and 104. The function of the multiplexers will be considered in detail with reference to FIG. 5. Multiplexer 102 is coupled to a series of registers referenced as GVR1...GVR8 corresponding to governor valves GV1 through GV8, and is also coupled to a register SVR providing the holding means for single valve control. Multiplexer 104 is coupled to a similar control network (not shown) for throttle valve control coupled to each setpoint storage register, is a digital-to-analog converter referenced, in the case of the governor valves, as: DAC-G1...DAC-G8 and, in the case of the single valve control, as: DAC-SV.

Converter DAC-SV is also referenced as 100 to show that it corresponds to the "means for converting set point representations from digital to analog form at a control point," specified also as means 100 in reference (2) above.

It will be noted that wherever the means employed according to the present invention are the same as those of reference (2) the same reference number is used. Relay contact 136 in FIG. 3, corresponds to the contact of the same number in the copending application, and is used to switch from manual control to automatic. It is shown in a position making contact with point 136M, corresponding to the manual mode of operation. During automatic operation, the contact is transferred to make contact with point 136A, at which time the setpoint value of register SVR is effective through converter DAC-SV to provide a single valve control signal.

Point 140 in FIG. 3 is the common control point for either automatic or manual and is applied to a series of summing impedances which may be resistors referenced as 134-1 to 134-8 corresponding to eight governor valve controls. It will be understood, of course, that as governor valves are grouped for control, the number of control functions is thereby reduced. For example, in a typical operation utilizing the invention, governor valves GV1 to GV4 may be controlled together so that setpoint register GVR1 is then utilized to provide a single position setpoint for valves GV1-GV4. In this case register GVR1 could be renamed as: GVR1-4. If the remaining governor valves are controlled individually then registers GVR5, GVR6, GVR7 and GVR8 would be employed. The invention may be utilized in any combination to provide the desired control.

The signal at point 140 is also fed back to analog input system 72 as signal AMSV for computer programmed tracking of the manual control signal prior to the switching back to automatic. The actual transfer of switch 136 from manual to automatic is a complex computer control function.

The governor valve setpoints stored in registers GVR1–GVR8 are converted through their respective digital to analog converters DAC-G1 through DAC-G8 to output signals which are applied through resistors 124–1...124–8 to summing junctions 125–1...125–8 connected to respective servo amplifiers SA1...SA8. Also connected to summing junctions 125 are feedback position signals PDG1...PDG8, applied through summing resistors 126–1...126–8, respectively. For example, signal PDG1 is fed back through resistor 126–1 to summing point 125–1 connected to servo amplifier SA1.

It will be noted that a system similar to that just described with respect to controlling the governor valve actuators may also be provided for throttle valve control. This is indicated by the showing of multiplexer 104 having an output connected to various throttle valve controls.

Figure 5:
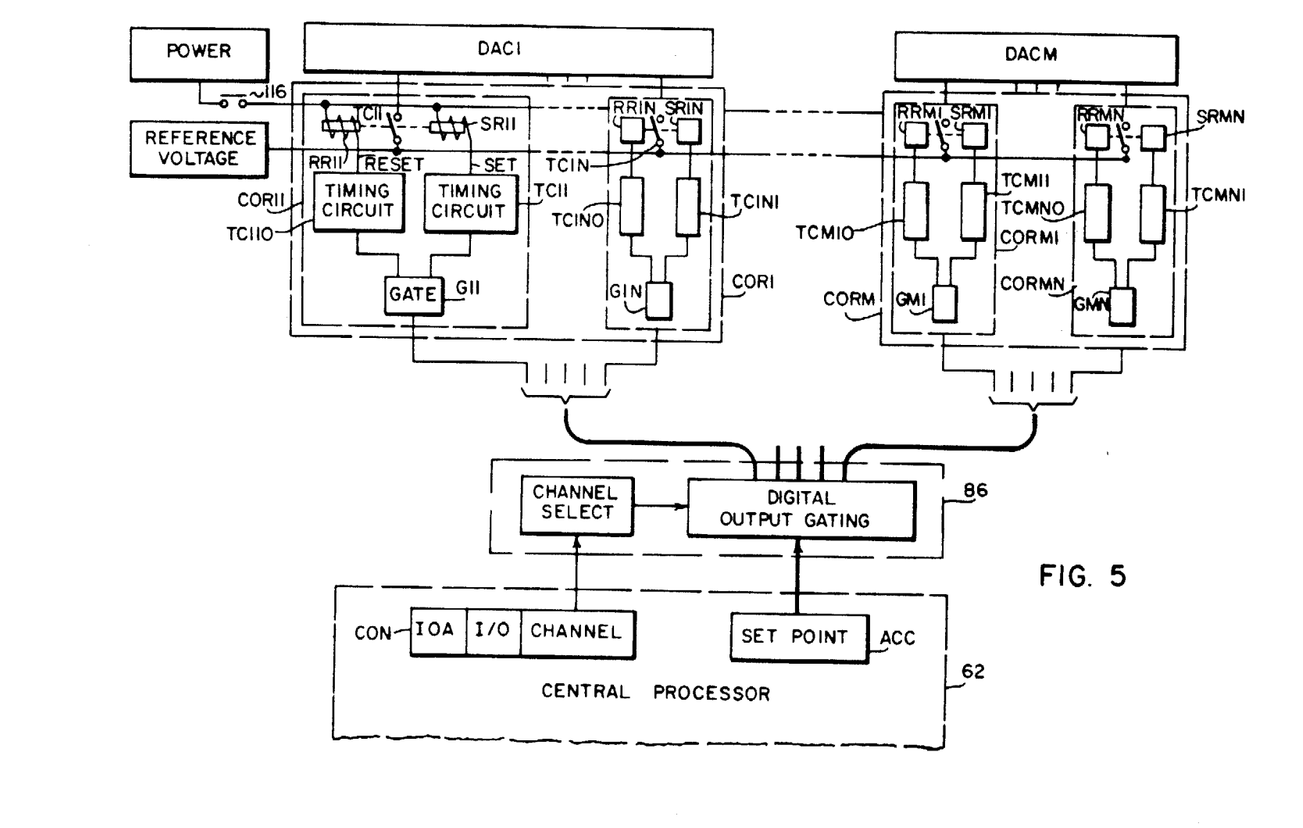
FIG. 5 is a schematic diagram of a suitable form of output and multiplexing system for use in the system of FIG. 3.

Switching power through appropriate means 145 is applied through contacts 116–1...116–8 to respective governor valve registers during automatic operation. Contacts 116 are opened during the manual control mode and registers GVR1–GVR8 then hold the last setpoint established by the computer. It is important therefore that registers GVR be bistable relays as shown in FIG. 5 which do not require power to hold their states. Since manual control may have been entered into due to a computer malfunction, the automatic removal of switching power from the set point storing registers provides an effective means of preventing an inadvertent change in these values. Once manual control begins through means 92, the signal developed by manual control is applied to point 140 and then modifies the position or signal input to the actuators in parallel by applying such modifying signal through resistors 134.

Figure 4A:
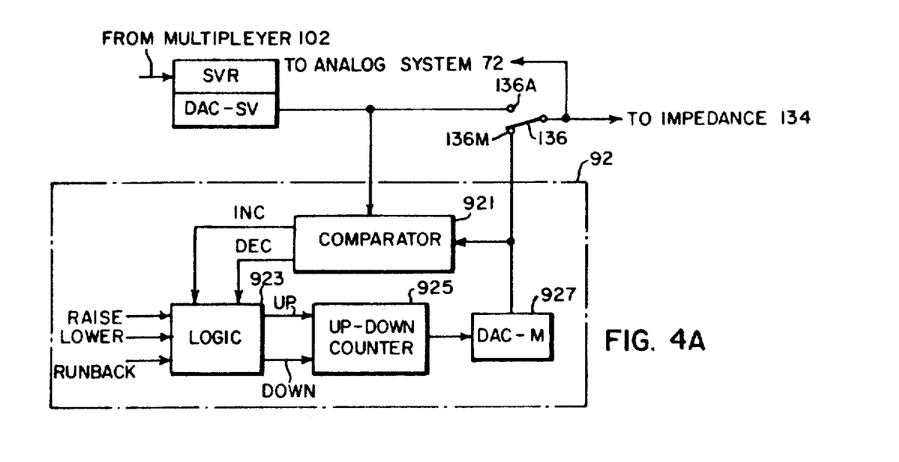
FIGS. 4A and 4B show two types of manual control circuits, one utilizing a digital up/down counter and the other using an analog track and hold amplifier.

Reference is now made to FIG. 4A where one form of manual control provided by the invention is shown. In FIG. 4A an analog comparator 921 receives the output signal of DAC-SV and also that of converter 927 (DAC-M). During automatic operation output signals references as INC and DEC produced by comparator 921 are utilized to develop UP (INC) and DOWN (DEC) control signals for a counter 925 by means of logic 923. This will be discussed in detail below. During manual operation, the UP and DOWN control signals for counter 925 are derived through logic 923 as a function of input signals: RAISE and LOWER. Comparator 921 and counter 925 are conventional devices well known in the art and will not be described in detail herein.

During manual control each time a RAISE signal is applied through logic 923, counter 925 is incremented at a predetermined rate in an UP direction and the output of counter 925 is converted into an analog signal through converter 927. This analog signal passes through relay switch 136 to point 140 and thence to impedances 135 shown in FIG. 3. A similar operation occurs when a LOWER signal is applied through logic 924 to counter 925, causing it to be reduced in value and the analog equivalent of counter 925 is supplied through point 140 to resistors 134. In this manner, digital tracking of the manual control is continuously updated through counter 925 which provides a stable manual control reference suitable for long time period utilization without drift. Furthermore, when the system is in the automatic mode of operation, the counter 925 is caused to continuously follow the setpoint value entered into register SVR so that when switchover occurs from automatic to manual, there is a "bumpless" transfer with respect to the signal at point 140.

The logic for means 923 may be expressed in a generalized and simplified form as follows:

$$UP = (INC.A + RAISE.M).R'$$

$$DOWN = (DEC.A + LOWER.M) + R,$$

Where A represents automatic control, M represents manual control, R represent runback, R' represents the not-runback case, INC, DEC, RAISE and LOWER are previously defined. The dot (.) is the logical "and" and the plus (+) is the logical "or." The prime (') is used to represent the complement.

According to this logic the UP control to counter 925, causing counting up at a predetermined rate, is provided in response to signal INC for automatic control and in response to signal RAISE for manual control, the UP control being disabled by the condition R' during runback.

The DOWN control for counter 925 is provided by the logic of decrease (DEC) for automatic, or lower (LOWER) for manual, or during runback control R.

The system may be switched from automatic to manual without any discontinuity in control since all values in registers GVR1–GVR8 remain undisturbed once switching power is removed and the value of the signal at point 140 is taken over by the manual control.

The transition from manual to automatic involves computer tracking control in order to insure that the setting of register SVR conforms to signal AMSV feedback through input system 72.

Figure 4B:
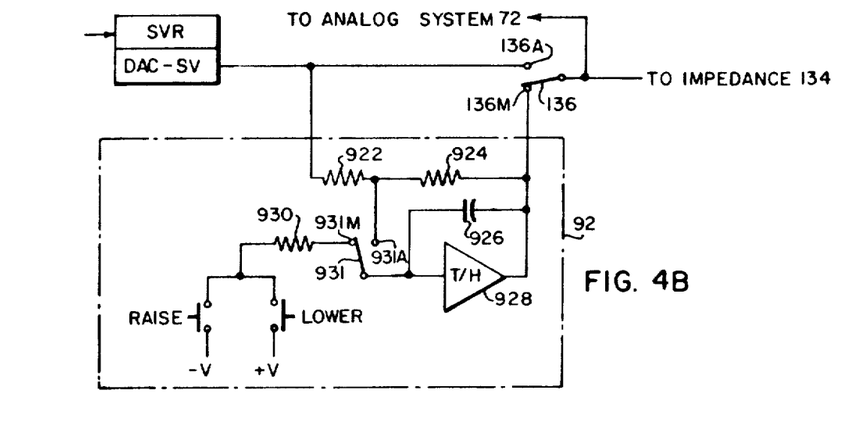

If the long term drift stability of counter 925 is not required and the advantage of certain simplicity is desired, the alternative embodiment of FIG. 4B may be employed. In this embodiment, the comparator function provided by circuit 921 is effectively accomplished through resistors 922 and 924 when contact 931 is in its upper position 931A for the automatic operation. In this case, amplifier 928 acts as a tracking amplifier and continuously charges a capacitor 926 to cause it to follow the value of the setpoint entered into register SVR. When switching to manual is made, whereby contact 136 assumes position 136M, and contact 931 assumes position 931M, track and hold amplifier 928 provides the "bumpless" transfer whereby the signal applied to point 140 and resistors 134 are not disturbed. After the transfer to manual control the value of the output signal of amplifier 928 may be adjusted by control signals RAISE and LOWER by applying suitable negative and positive voltage through resistor 930 and switch 931 to the amplifier.

It will be understood that although relay switching has been specified herein, the broad concept of the invention is not so limited. The term "switch" therefore as utilized herein is intended to be a generic term covering any means accomplishing the desired end result.

In the above discussion it has been assumed that the means providing digital word communication between the central processor and the various setpoint storage registers is a multiplexer such as that referenced as means 102 in FIG. 3. In the broad context of the invention, however, any means suitable for directing setpoint control words to the appropriate register will serve this function. To illustrate a suitable control technique FIG. 5 is provided where the central processor 62 is assumed to include means for providing an input output-control instruction referenced as CON including an operation code IOA specifying input or output from the accumulator, a control bit representing I/O where a 1 represents input and a 0 represents output and a channel address code for selecting an appropriate receiving register in the case illustrated. In addition, the processor includes an accumulator ACC which is filled with the setpoint to be routed to the addressed register. The output system 86 then is controlled by the channel address to select, through appropriate digital output gating, which of the registers is to receive the setpoint.

It is assumed in the illustrative case of FIG. 5 that there are a plurality (M) of bistable relay registers and a corresponding plurality of digital to analog converters coupled thereto. Each register is referred to as a contact output register and the references COR1...CORM are provided to represent the plurality of registers and associated control functions. Only the specific details of COR1 will be considered since the control functions may be identical in all registers. Considering specifically the control for set and reset armatures SR11 and RR11, it will be noted that a transfer contact TC11 may assume either of two possible bistable states under the control of the set and reset armatures. Sufficient magnetism remains in each armature to hold contact TCC1 in whatever position it is placed without power so that if switch 116 is opened, as previously discussed, and power is removed from the system contact TC11 and other similar contacts will remain in whatever state they have been placed prior to power removal. Reset armature RR11 is controlled through a timing circuit TC110 and set armature SR11 is controlled through a timing circuit TC111 each of which receives a signal to an appropriate gate G11 receiving its signal through the digital output gating. The function of gate G11 is to operate timing TC110 when the input bit is a zero and to operate timing circuit TC111 when the input bit is a one. The purpose of the timing circuits is to hold a control signal on the appropriate relay armature for a minimum period of five milliseconds after the digital output gating has terminated so as to permit the processor to continue its operating functions while providing a sufficient current actuation time for the relatively slow acting relay.

Corresponding to contact output relay control COR11 there are a total of N similar or identical circuits within contact output register control COR1 only the first and the nth in this series are shown and specific details of the bistable relay are shown only in COR11. Corresponding to the number of setpoint register controls required there are M circuits like COR1 and within each of these are a number (N) of relay control circuits that have been described corresponding to the number of binary bits in the control words which is utilized to specify the setpoint in the system.

During the automatic computer operation the so-called multiplexing is accomplished by program control and setting up the appropriate setpoint value in the accumulator ACC and establishing the corresponding channel address and input output control as noted above. If the program is made to automatically sequence setpoint entry for all registers it may then be considered to be multiplexing program, but the invention may be operated to control only a single register during a particular program subroutine such as may be utilized for tracking the manual operation just prior to the switching to automatic control.

From the foregoing description it should now be apparent that the present invention provides an important improvement in means for improving the operation of an electric power plant with particular emphasis upon an automaticmanual control technique whereby the valves of a steam turbine may be positioned either automatically through a computer program or by means of a manual backup control system. The invention simplifies the tracking which is required for either manual to automatic or automatic to manual switching and eliminates drift with respect to valve position so as to extend the period of reliable operation in the manual mode. The specific use of the bistable relay control provides a further improvement in that computer power failure will not cause the loss of the last setpoint position and the invention makes it further possible to take over manual control from the last setpoint position and to increase or decrease the position signals then existing.

I claim:

1. A system for controlling the positions of a plurality of valves to determine the operating level of a turbine comprising a central processor operative to generate control words defining position setpoints for said valves; a plurality of setpoint storage registers, including at least one single valve setpoint storage register; means for selectively directing said control words to said setpoint storage registers; a plurality of converters for translating the values in said storage registers into corresponding analog signals; means responsive to manual control input signals for raising or lowering the value of a manual control signal under operator control; means for increasing or decreasing said manual control signal during automatic operation to maintain substantial equality between said manual control signal and the analog value of said single value setpoint; automanual switching means for selectively coupling said manual control means or said single valve setpoint converter to a common control point; means for generating analog signals representing valve setpoints; and network means coupled to said common control point for combining the selected signal derived through said auto-manual switching means with analog signals representing said valve setpoints to produce a corresponding plurality of servo amplifier input signals for controlling the position of said valves.

2. The control system defined in claim 1 wherein said manual control means includes: an up-down counter; a converter for translating the digital state of said counter into said manual control signal; and logic and comparison means for incrementing or decrementing said counter during automatic operation so as to track the level of said single valve setpoint and means for raising or lowering the value in said counter during manual operation in response to corresponding operator signals.

3. The control system defined in claim 1 wherein said manual control means includes: a track and hold amplifier; a comparison network; a switching element operative during automatic operation to connect said comparison network to said track and hold amplifier; and means for applying manual raise and lower control signals to said switching element for application to said track and hold amplifier during manual operation.

4. The control system defined in claim 1 wherein said valve setpoint registers comprise bistable relays operable to hold the last digital value entered therein after removal of power and switching means are provided for disconnecting switching power from said valve setpoint registers during manual control operation.

5. The control system defined in claim 4 wherein network means includes at least first and second summing resistors, the first summing resistor being connected to a converter producing an analog signal representing a governor valve setpoint and the second summing resistor being connected to said control point.

6. The control system defined in claim 5 wherein said network means further includes a third resistor for applying a feedback signal representing the actual position of a valve being controlled.

7. A control system for apparatus having a plurality of devices with each device being characterized with at least one controllable variable which affects the operation of the apparatus, said control system comprising a digital computer system operative to generate at one of its outputs control words defining setpoints for the variables associated with the respective devices, an improved auto-manual control system comprising: a plurality of digital setpoint storage registers and associated digital-to-analog converters; a digital multiplexer for directing digital representations of the setpoint control words to said storage registers; a plurality of control networks coupling certain of said converters to a corresponding plurality of device controllers; manual control means including circuits for producing a manual control output signal having a value variable in response to raise and lower operator input signals during a manual mode of operation and further circuits for increasing or decreasing said manual control signal during an automatic mode of operation to correspond to the setpoint value of one of said setpoint storage registers; and auto-manual switching means for selectively coupling either the converted output of said one setpoint storage register or the output of said manual control means to said control networks.

8. The control system defined in claim 7 wherein said devices are valves and converters DAC-G1...DAC-Gn (where n represents a number of valves) are coupled individually through separate summing impedances to respective control networks, and a converter DAC-SV is applied to one terminal of a switch in said auto-manual switching means, the other terminal of which is connected to a converter DAC-M constituting the output means for said manual control means.

9. The control system defined in claim 7 wherein said manual control means comprises: a comparator coupled to one of said digital-to-analog converters for producing increase and decrease signals as a function of the comparison of the analog value of said one analog converter and the output of said manual control means; an up-down counter; a converter for translating the counter state into said output; and logic for applying said increase and decrease signals to said counter during automatic operation and for applying raise and lower control signals during manual operation.

10. A steam turbine system for generating electric power wherein the level of power produced is controlled as a function of the position setting of a plurality of valves, said system comprising: a plurality of hydraulic valve actuators coupled to said valves, respectively, and a corresponding plurality of position controls each of which produces a signal specifying the absolute value of the position of a corresponding valve; a plurality of digital setpoint registers coupled to a corresponding plurality of digital to analog converting means producing first input signals for said position controls, respectively; means for digitally processing data having a programmed digital computer central processor; a manual control circuit and said digital means including a single valve register, digital to analog converter coupled to said digital means, means for tracking an electrical signal connected to said converter, a manual control circuit connected to said tracking means, and a switch connected to said tracking means whereby switching between a manual control state and an automatic control state is permitted, said manual control circuit producing a common control signal applied to said position controls in parallel, said tracking means connected to an input of said digital means whereby a signal from said tracking means can be monitored by said digital means, said central processor being programmed to permit manual to automatic switching such that the setpoint value placed in said single valve register is made to equal the existing manual control signal level at said tracking means prior to actuating said switch to an automatic state, the output signal derived through said switch providing a means of controlling all of said valves in parallel.

11. The steam turbine system defined in claim 10 wherein each of said position controls includes a summing network for combining said common signal individually with each of the other valve control signals.

12. The steam turbine system defined in claim 11 wherein each of said networks further includes means for summing a valve position feedback signal and a servo-amplifier coupled to the summing junction for producing a driving signal for the corresponding valve actuator.

* * * * *